United States Patent
Khan

(10) Patent No.: US 10,264,222 B2
(45) Date of Patent: Apr. 16, 2019

(54) WINDOW-INSTALLED WIRELESS COMMUNICATIONS DEVICE

(71) Applicant: Phazr, Inc., Allen, TX (US)

(72) Inventor: Farooq Khan, Allen, TX (US)

(73) Assignee: Phazr, Inc., Allen, TX (US)

( * ) Notice: Subject to any disclaimer, the term of this patent is extended or adjusted under 35 U.S.C. 154(b) by 108 days.

(21) Appl. No.: 15/427,911

(22) Filed: Feb. 8, 2017

(65) Prior Publication Data

US 2018/0227144 A1 Aug. 9, 2018

(51) Int. Cl.

| | |
|---|---|
| H04N 7/18 | (2006.01) |
| H04B 7/14 | (2006.01) |
| H04L 12/46 | (2006.01) |
| H04B 1/50 | (2006.01) |
| H04B 1/54 | (2006.01) |
| H04B 5/00 | (2006.01) |
| H04N 5/232 | (2006.01) |
| H04W 88/08 | (2009.01) |

(52) U.S. Cl.
CPC ............ H04N 7/183 (2013.01); H04B 1/50 (2013.01); H04B 1/54 (2013.01); H04B 5/0037 (2013.01); H04N 5/23293 (2013.01); H04W 88/08 (2013.01)

(58) Field of Classification Search
CPC .......... H04B 5/0037; H04B 7/14; H04B 7/15; H04B 7/2606; H04N 5/23212; H04N 5/23293; G06T 19/00; H04L 12/46
See application file for complete search history.

(56) References Cited

U.S. PATENT DOCUMENTS

| | | | | |
|---|---|---|---|---|
| 2005/0260983 A1* | 11/2005 | DiPiazza | ............. | H04B 7/2606 455/426.1 |
| 2008/0310675 A1* | 12/2008 | O'Brien | ................. | G06T 19/00 382/100 |
| 2009/0051699 A1* | 2/2009 | Posa | .................. | H04N 13/0468 345/619 |
| 2011/0069158 A1* | 3/2011 | Shiloh | .................... | H04N 7/181 348/61 |
| 2012/0200756 A1* | 8/2012 | Church | .................... | H04N 7/18 348/333.01 |
| 2015/0297103 A1* | 10/2015 | Hu | ......................... | A61B 5/031 600/561 |

(Continued)

Primary Examiner — Scott M Sciacca
(74) Attorney, Agent, or Firm — Michael A. Rahman

(57) ABSTRACT

A device is configured for installation on a building window. The device may be a wireless communications device or any other device configured for installation on a window. The device includes an exterior-facing camera operable to acquire video and/or images and an interior-facing monitor. The acquired video and/or images are transmitted to the monitor and displayed by the monitor in real-time which causes the device to appear transparent to a person inside the building. The device includes a first wireless transceiver configured to communicate with a radio base station outside the building and a second wireless transceiver configured to communicate with a plurality of communication devices inside the building. The first wireless transceiver transmits uplink signals at a first frequency and receives downlink signals at a second frequency. The second wireless transceiver transmits downlink signals and receives uplink signals at the first frequency.

10 Claims, 5 Drawing Sheets

(56) References Cited

U.S. PATENT DOCUMENTS

| | | | |
|---|---|---|---|
| 2016/0020650 A1* | 1/2016 | Distelzweig | H02J 50/12 |
| | | | 307/104 |
| 2016/0301867 A1* | 10/2016 | Robinson | H04N 5/23241 |
| 2016/0325836 A1* | 11/2016 | Teo | B64D 11/0015 |
| 2018/0026722 A1* | 1/2018 | Ashrafi | H04B 10/2575 |

* cited by examiner

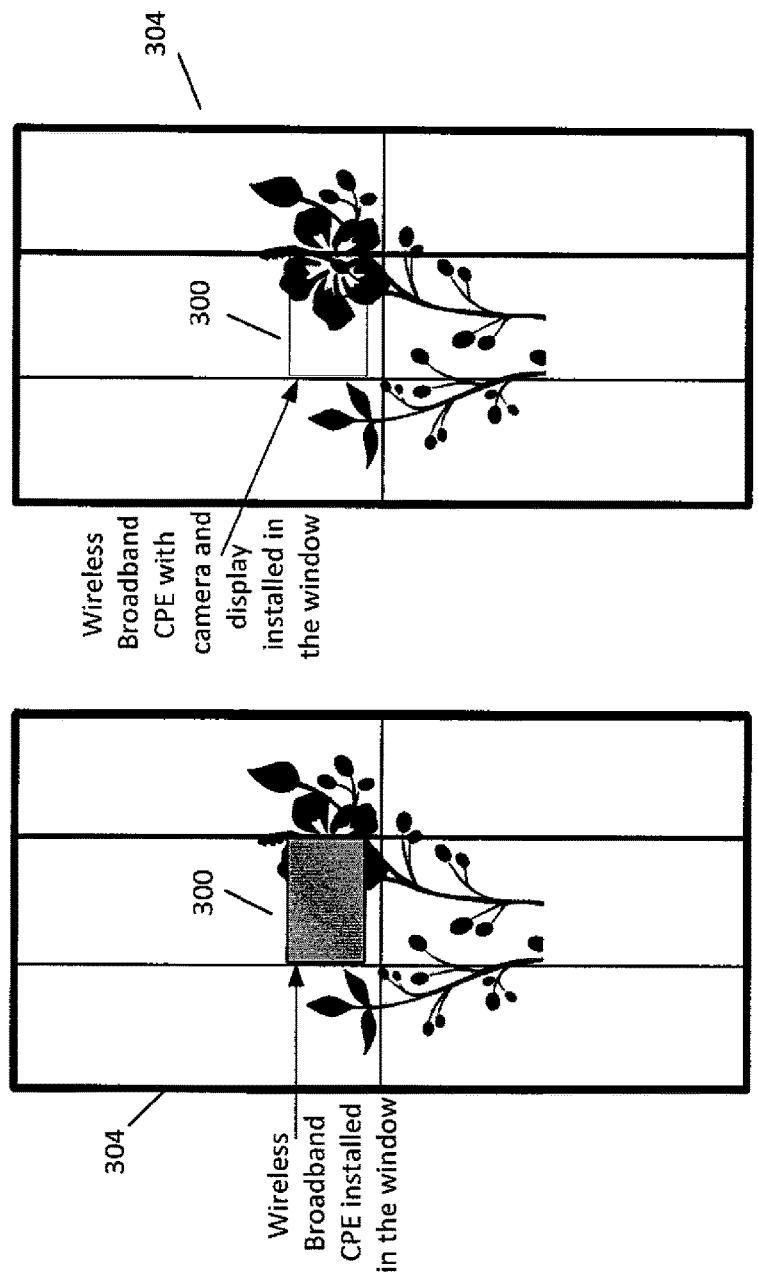

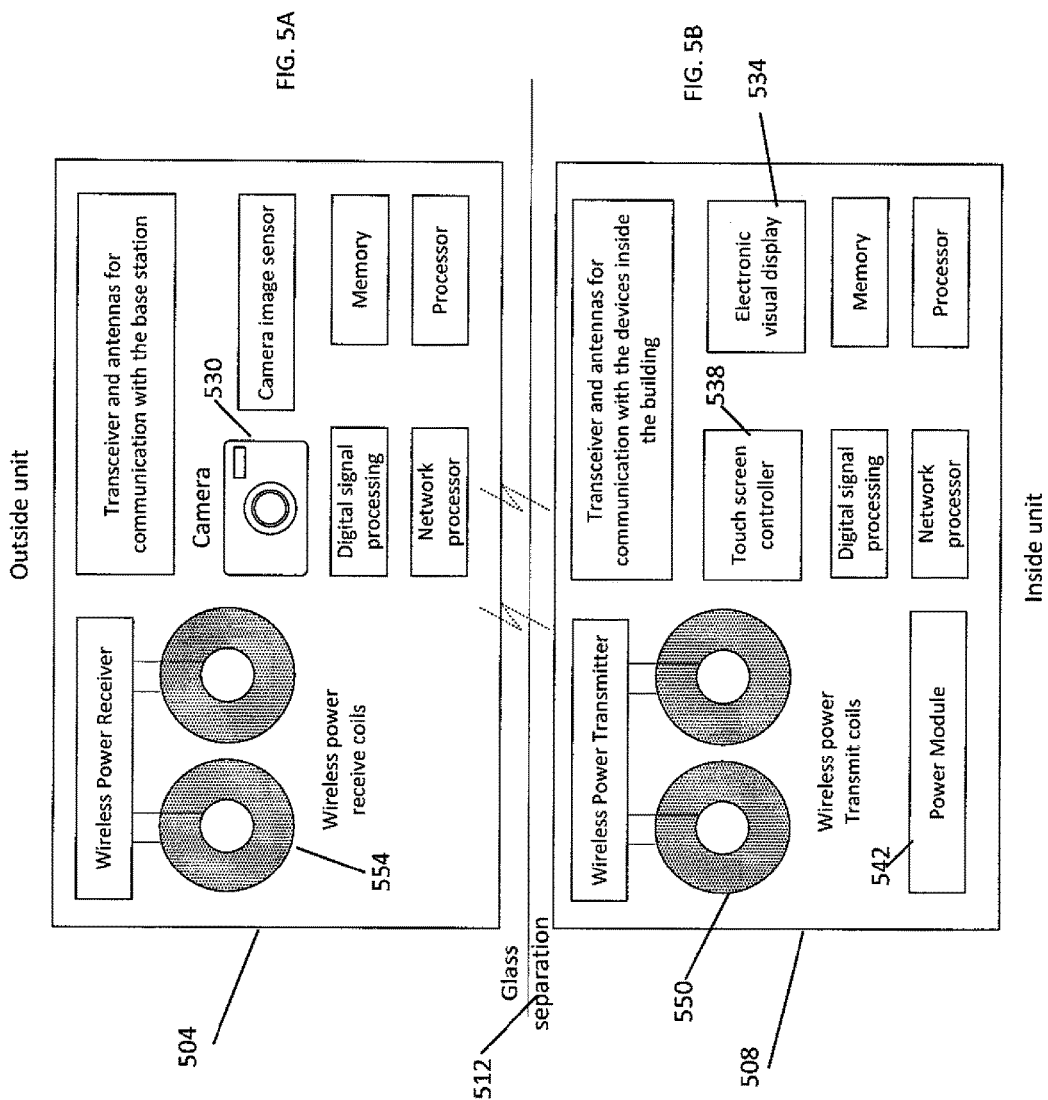

WINDOW-INSTALLED WIRELESS COMMUNICATIONS DEVICE

BACKGROUND

The invention relates to wireless communications devices, and in particular the invention relates to window-installed wireless broadband communications devices.

DESCRIPTION OF THE RELATED ART

Currently, two primary methods for access to the Internet are wired broadband and wireless access. Wired broadband Internet access mechanisms are based on three different standards: Digital Subscriber Line (DSL); Data Over Cable Service Interface Specification (DOCSIS); and Fiber-to-the-Home (FTTH). G.fast is a DSL standard for local loops shorter than 250 meters, with performance between 150 Megabit/s and 1 Gigabit/s, depending on loop length with higher speeds achieved over very short loops. Although G.fast is designed for loops up to 250 meters, the loop lengths are limited to just tens of meters for Gigabit/s data rates.

By using the latest DOCSIS 3.1 standard, Gigabit/s can be achieved over relatively longer distances of several hundred meters but it requires upgrading the equipment at both endpoints: cable modem (CM) and cable modem termination system (CMTS). The Fiber-to-the-Home (FTTH) service can extend Gigabit/s range over even longer distances but its availability has been limited to high population density areas only due to higher costs involved in trenching and the right-of-way issues that follow from shared driveways etc. Furthermore, the wired Broadband services require a technician to come to customer premises to complete the installation which adds to the costs and delays in service availability.

Wireless access methods are generally based on two standards. A wide area network (WAN) standard referred to as The Fourth Generation Long Term Evolution (4G LTE) system and a local area network (LAN) standard called Wi-Fi. Wi-Fi is generally used indoors as short-range wireless extension of wired broadband systems. The 4G LTE systems on the other hand provide wide area long-range connectivity both outdoors and indoors using dedicated infrastructure such as cell towers and backhaul to connect to the Internet.

As more people connect to the Internet, increasingly chat with friends and family, watch videos, listen to streamed music, and indulge into virtual/augmented reality, data traffic continues to grow at unprecedented rates. In order to address the continuously growing wireless capacity need, the next generation LAN and WAN systems referred to as 5G systems will rely on higher frequencies (e.g., millimeter wave frequencies). A drawback of millimeter wave frequencies, however, is that they tend to lose more energy than lower frequencies lose over long distances because they are readily absorbed or scattered by gases, rain, and foliage. Millimeter waves also experience higher losses when penetrating through structures such as walls or other building materials. For these reasons, wireless communications devices designed to operate at millimeter wave bands generally communicate with another device (e.g., transceiver) located within a line of sight. Users typically place millimeter wave band communications devices near a window, or attach to, or install on, a window so the devices are within a line of sight of another transceiver. The installation on the window reduces outdoor to indoor penetration losses experienced at millimeter waves frequencies.

One drawback of a device installed on a window is the device partially blocks the outside view through the window.

BRIEF SUMMARY OF THE INVENTION

According to disclosed embodiments, a device is configured for installation on a building window. The device may be a wireless communications device or any other device configured for installation on a window.

In one aspect, the device includes an exterior-facing camera operable to acquire video and/or images and an interior-facing monitor. The acquired video and/or images are transmitted to the monitor and displayed by the monitor in real-time which causes the device to appear transparent to a person inside the building.

In one aspect, the device includes a first wireless transceiver configured to communicate with a radio base station outside the building and a second wireless transceiver configured to communicate with a plurality of communication devices inside the building. The first wireless transceiver transmits uplink signals at a first frequency and receives downlink signals at a second frequency. The second wireless transceiver transmits downlink signals and receives uplink signals at the first frequency.

In another aspect, a device configured for installation on a building window includes an exterior unit and an interior unit. The exterior and interior units are separated by the window. The exterior unit includes an exterior-facing camera operable to acquire video and/or images. The interior unit includes an interior-facing monitor. The acquired video and/or images are transmitted to the monitor and displayed by the monitor in real-time, wherein displaying the video and/or images by the monitor in real-time causes the device to appear transparent from the interior of the building.

In one aspect, the interior unit comprises wireless power transmit coils and the exterior unit comprises wireless power receive coils, and wherein power is transferred wirelessly by the transmit coils to the receive coils. The transmit and receive power coils may be aligned on the interior and exterior units to maximize power transfer efficiency.

BRIEF DESCRIPTION OF THE DRAWINGS

FIGS. 3A and 3B illustrate a communications device installed on a window;

FIGS. 5A and 5B illustrate outside and inside units, respectively, of a communication device.

DETAILED DESCRIPTION

Figure 1:
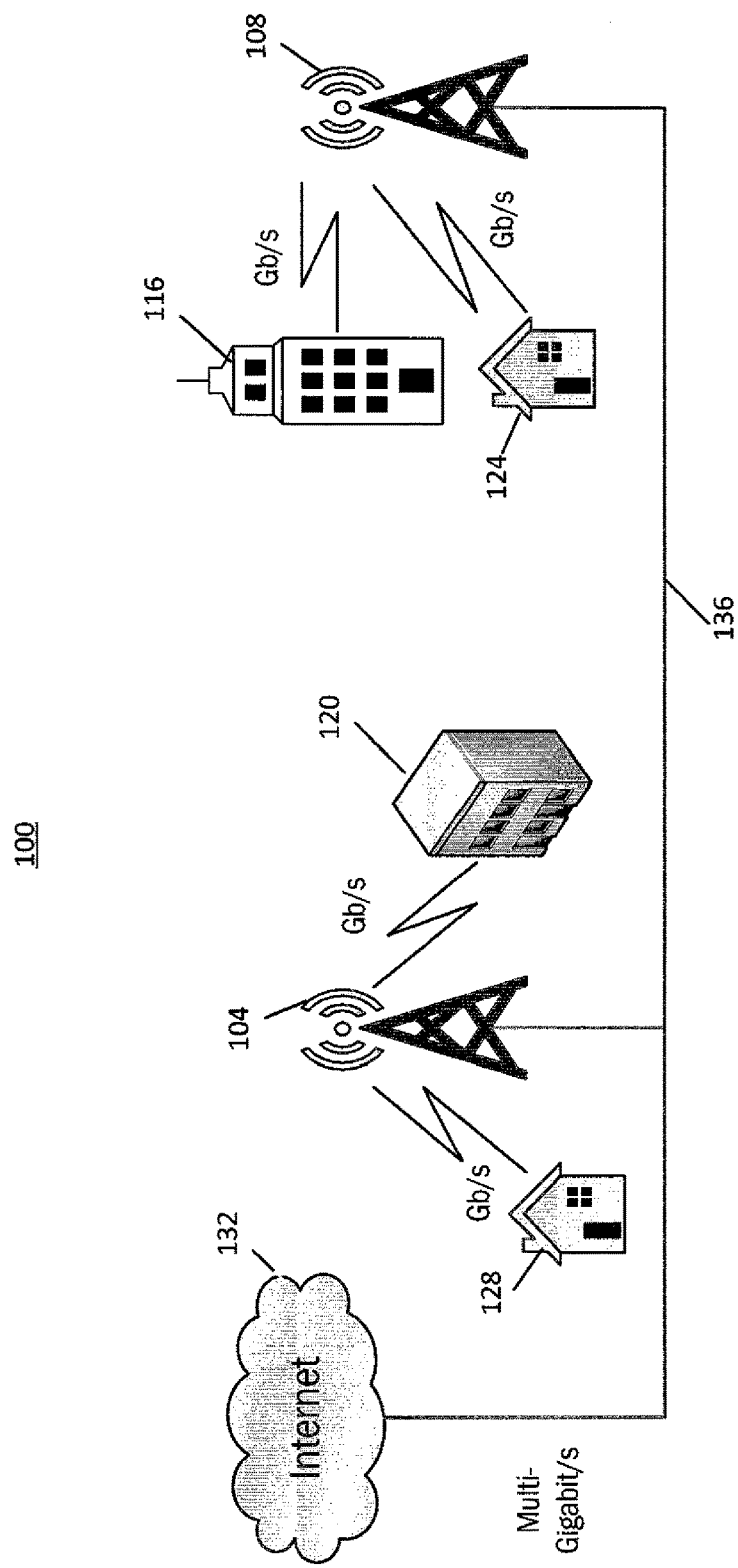
FIG. 1 illustrates a wireless network in accordance with disclosed embodiments.

According to disclosed embodiments, gigabits per second access to users inside residential and business buildings is enabled by a 5G Millimeter wave network 100 illustrated in FIG. 1. Network 100 includes radio base stations 104 and 108 each capable of supporting an aggregate data capacity of hundreds of Gigabits/s serving hundreds of window-installed broadband communication devices inside buildings 116, 120, 124 and 128 at data speeds in excess of Gigabits/s.

Radio base stations 104 and 108 are connected to the Internet 132 via fiber optical links (or any other wired link) 136 designed to handle aggregate data from multiple radio base stations.

Figure 2:
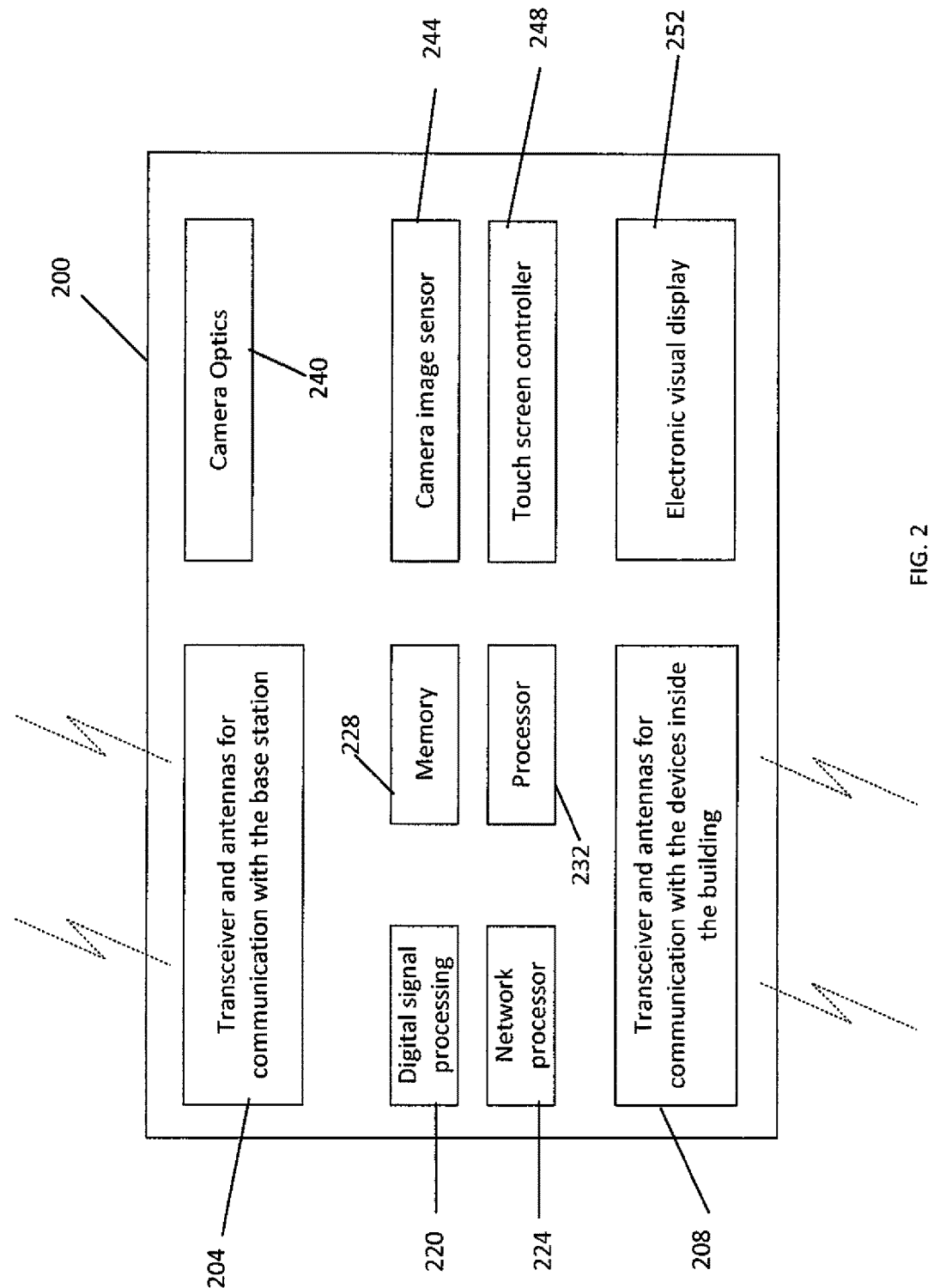
FIG. 2 illustrates a wireless communications device in accordance with disclosed embodiments.

FIG. 2 illustrates wireless communications device 200 in accordance with disclosed embodiments. Communications device 200 is installed on, or attached to, a building window to enable reception of radio signals from the outside. Thus, the window-installed device overcomes the outside to inside signal penetration problem.

Referring to FIG. 2, communications device 200 includes transceiver 204 configured to communicate with a base station located outside the building, and also includes transceiver 208 configured to communicate with a plurality of communications devices inside the building. According to some disclosed embodiments, transceiver 204 is configured to receive downlink signals from a base station at a millimeter wave band (e.g., 24 GHz band, 28 GHz band, 39 GHz band, 60 GHz band) and to transmit uplink signals to the base station at a lower frequency (e.g., 4G LTE band or Wi-Fi band). According to some disclosed embodiments, transceiver 208 is configured to transmit downlink signals to a plurality of communications devices inside the building at the lower frequency (e.g., 4G LTE band or Wi-Fi band) and to receive uplink signals from the communications devices at the lower frequency. Communications device 200 also includes other components and circuits customarily associated with such a device such as, for example, digital signal processor 220, network processor 224, memory 228 and CPU 232. Memory 228 may include a RAM (random access memory) and an EEPROM (electrically erasable programmable read-only memory) to temporarily or permanently store information.

According to disclosed embodiments, communications device 200 includes a camera module configured to acquire video and images. The camera module may be an exterior-facing camera comprising camera optics 240, image sensor 244, and touch screen controller 248. Communications device 200 also includes an interior-facing visual display such as video monitor 252. The term "exterior-facing" refers to the side facing outside the building and the term "interior-facing" refers to the side facing inside the building. In operation, video and/or images of the exterior acquired by the camera are transmitted to monitor 252 and displayed by the monitor in real-time. When the device is attached to, or installed on, a window, the device partially blocks the exterior view through the window. By displaying the exterior video and/or images on the interior-facing monitor in real-time, the device appears transparent to a person looking at the monitor. Thus, from inside the building the device appears to not partially block the exterior view through the window.

According to disclosed embodiments, camera optics 240 can be adjusted to focus the camera. For example, camera optics 240 can be adjusted so that the camera is focused to acquire only the image that is blocked by the placement of the communication device on the window. However, the camera optics can also be adjusted to acquire a wider view or a narrow view.

FIG. 3A illustrates communications device 300 installed on window 304. As shown in FIG. 3A, communications device 300 partially blocks the exterior view through window 304. However, when communications device 300 is in operation and exterior video and/or images are displayed on the inside-facing video monitor, the communications device appears to be transparent as shown in FIG. 3B. Thus, to a person inside the building, the communications device appears not to partially block the exterior view through the window.

Figures 4A, 4B:
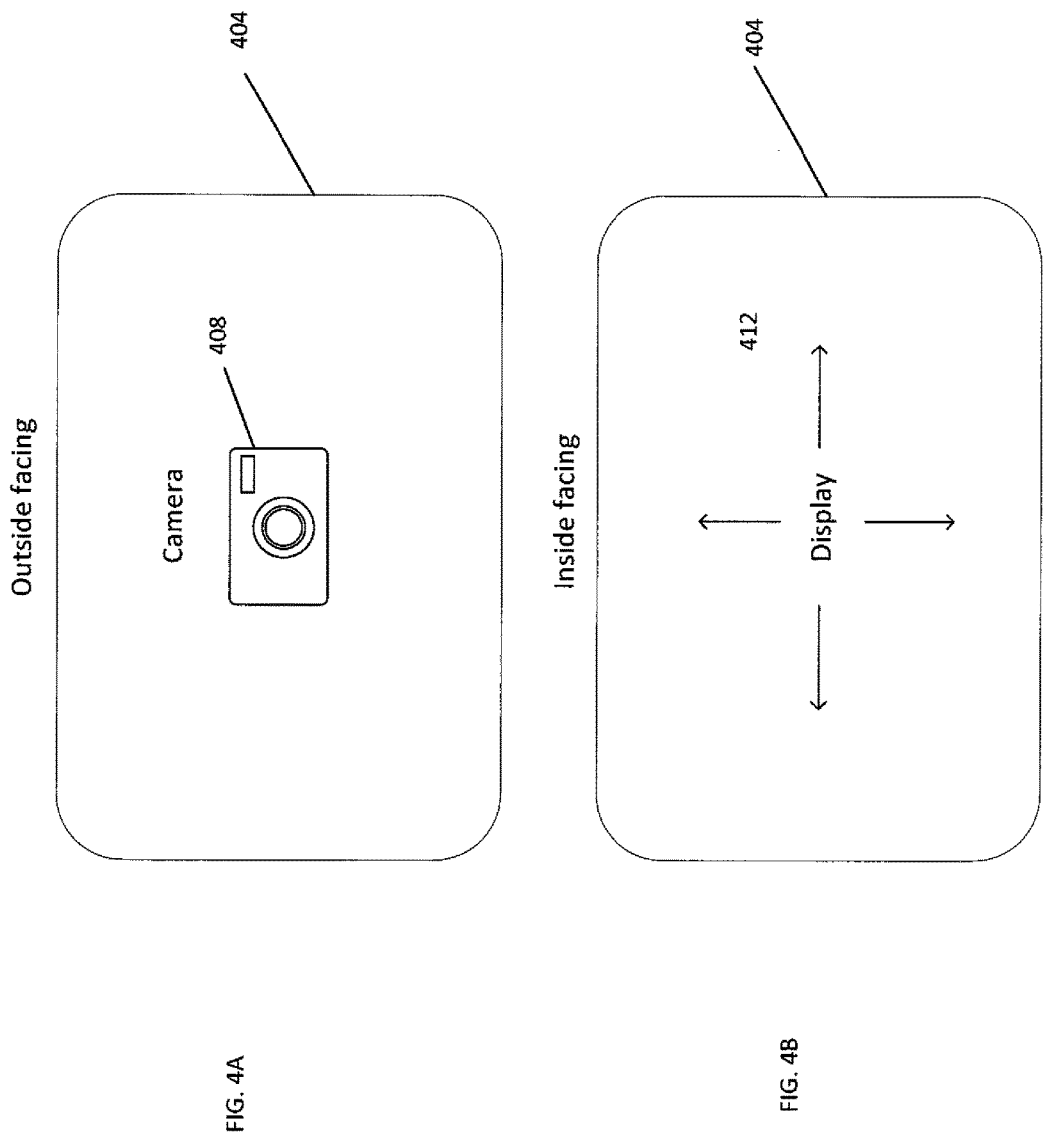
FIGS. 4A and 4B illustrate the exterior face and the interior face, respectively, of a window installed communications device.

FIG. 4A illustrates the exterior face of window installed communications device 404 in accordance with disclosed embodiments. Communications device 404 includes outside-facing camera 408 configured to acquire video and/or images.

FIG. 4B illustrates the interior face of communications device 404. Communications device 404 includes monitor 412 configured to display acquired video and/or images in real-time. As a result, communications device 404 appears transparent to a person inside the building.

According to some disclosed embodiments, monitor 412 extends across the entire interior face of communications device 404. Thus, monitor 412 covers the entire inside-facing side of communications device 404. According to some disclosed embodiments, monitor 412 includes a screen which is curved at the edges.

According to yet another disclosed embodiment, the functionality of a window-installed communication device is split across a window separating the outside and inside environments. FIGS. 5A and 5B illustrate outside unit 504 and inside unit 508, respectively, of a communication device. Outside unit 504 and inside unit 508 are separated by window 512. Outside unit 504 communicates with a radio base station while inside unit 508 communicates with a plurality of communication devices inside.

According to disclosed embodiments, inside and outside units 504 and 508 communicate with each other using either a wired or a wireless link. Outside unit 504 implements camera 530 to capture images and video while inside unit 508 implements electronic visual display 534 to display the captured images and/or video. Inside unit 508 also implements touch screen controller 538 to provide direct user interaction with wireless broadband communication device 500.

According to disclosed embodiments, inside unit 508 contains power module 542 that can operate directly from 120/240V AC or 12V DC power. Optionally, inside unit 508 can provide power to outside unit 504 using wireless power transmit coils 550 and wireless power receive coils 554. The transmit and receive coils for wireless power can be aligned on the inside and outside units to maximize the power transfer efficiency.

According to some disclosed embodiments, display 534 includes a screen which extends across the entire interior face of the communications device. Thus, display 534 covers the entire inside-facing side of the communications device. According to some disclosed embodiments, display 534 includes a screen which is curved at the edges.

According to disclosed embodiments, an image or a sequence of images captured by the outside facing camera can be encoded before transmission to the inside facing display in the wireless communication device. The encoding allows to digitally alter the image data to remove certain artifacts such as lens distortion. The encoding can also be used to compress the image data file to reduce the size for transmission. The image data can be transmitted on a shared or dedicated data bus in the wireless broadband communication device. The image data is received and decoded before displaying on the inside facing visual display. In other embodiments, the captured image data can also be transmitted to the cloud for storage or monitoring.

Those skilled in the art will recognize that, for simplicity and clarity, the full structure and operation of all systems suitable for use with the present disclosure is not being depicted or described herein. Instead, only so much of a system as is unique to the present disclosure or necessary for an understanding of the present disclosure is depicted and described. The remainder of the construction and operation of the disclosed systems may conform to any of the various current implementations and practices known in the art.

Of course, those of skill in the art will recognize that, unless specifically indicated or required by the sequence of operations, certain steps in the processes described above may be omitted, performed concurrently or sequentially, or performed in a different order. Further, no component, element, or process should be considered essential to any specific claimed embodiment, and each of the components, elements, or processes can be combined in still other embodiments.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Those skilled in the art to which this application relates will appreciate that other and further additions, deletions, substitutions and modifications may be made to the described embodiments.

What is claimed is:

1. A wireless communication device configured for installation on a building window, comprising:
    an exterior unit and an interior unit separated by the window;
    the exterior unit including:
        an exterior-facing camera operable to acquire video; and
        a first wireless transceiver configured to receive downlink signals from a radio base station outside the building using a millimeter wave band;
    the interior unit including:
        an interior-facing monitor; and
        a second wireless transceiver configured to communicate with a plurality of communication devices inside the building using a 4G LTE or Wi-Fi band,
    wherein the exterior-facing camera and interior-facing monitor are integrated into the wireless communication device, and wherein the acquired video is digitally encoded and transmitted to the monitor and displayed by the monitor in real-time.

2. The device of claim 1, wherein the camera is focused to acquire video of the exterior view being blocked by the device.

3. The device of claim 1, wherein the camera is focused to acquire video of the exterior that a person would view if the device was completely transparent.

4. The device of claim 1, wherein the device has an exterior-facing side and an interior-facing side, and wherein the monitor has a display screen which covers the interior-facing side.

5. A wireless communication device configured for installation on a building window, comprising:
    an exterior unit and an interior unit separated by the window;
    the exterior unit including:
    an exterior-facing camera operable to acquire video; and
    a first wireless transceiver configured to receive downlink signals from a radio base station outside the building using a millimeter wave band;
    the interior unit including:
    an interior-facing monitor; and
    a second wireless transceiver configured to communicate with a plurality of communication devices inside the building using a 4G LTE or Wi-Fi band,
    wherein the exterior-facing camera and interior facing monitor are integrated into the wireless communication device, and wherein the acquired video is digitally encoded, compressed and transmitted to the monitor, wherein the encoding includes digitally altering the image to remove lens distortion, and wherein the compression includes reducing the size of an image data file, wherein the video is displayed by the monitor in real-time.

6. The device of claim 5, wherein the interior unit further comprises wireless power transmit coils, and wherein the exterior unit further comprises wireless power receive coils, and wherein power is transferred wirelessly by the transmit coils to the receive coils.

7. The device of claim 6, wherein the transmit and receive power coils are aligned on the interior and exterior units to maximize power transfer efficiency.

8. The device of claim 5, wherein the camera is focused to acquire video of the exterior view being blocked by the device.

9. The device of claim 5, wherein the camera is focused to acquire video of the exterior that a person would view if the device was completely transparent.

10. The device of claim 5, wherein the device has an exterior-facing side and an interior-facing side, and wherein the monitor has a display screen which covers the interior-facing side.

* * * * *